(12) United States Patent
Martin et al.

(10) Patent No.: US 6,594,561 B2
(45) Date of Patent: Jul. 15, 2003

(54) SYSTEM AND METHOD FOR GENERATING VEHICLE ALIGNMENT REPORTS

(75) Inventors: Michael Stephens Martin, Atlanta, GA (US); Taesha Diggs Beasley, Chandler, AZ (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 09/681,429

(22) Filed: Apr. 2, 2001

(65) Prior Publication Data

US 2002/0177930 A1 Nov. 28, 2002

(51) Int. Cl.[7] .............................................. G06F 7/70
(52) U.S. Cl. .............................. 701/29; 701/35; 33/288
(58) Field of Search ..................... 701/29, 35; 700/279; 705/1, 28, 29; 33/288; 356/155, 139.09

(56) References Cited

U.S. PATENT DOCUMENTS 5,948,024 A    9/1999   O'Mahony et al.
6,064,927 A    5/2000   Molbach et al.

Primary Examiner—Richard M. Camby
(74) Attorney, Agent, or Firm—Brooks & Kushman P.C.; David B. Kelley

(57) ABSTRACT

A method and system are provided for generating vehicle alignment reports. Preferred aspects of the present invention comprise receiving at a computer a plurality of alignment characteristics in an electronic format directly from a vehicle alignment auditing machine, receiving at the computer alignment session information, and outputting the alignment characteristics and alignment session information via computer network to a central alignment data repository remote from the computer. An additional aspect of the present invention comprises downloading historical vehicle alignment characteristics, historical alignment session information and predefined alignment specification information via computer network from the central alignment data repository and generating at least one historical alignment report based on the downloaded data.

12 Claims, 8 Drawing Sheets

| File | | | | | |
|---|---|---|---|---|---|
| Information | | | | | |
| Vehicle Type | | | | | Submit |
| Taurus Sedan -- Taurus Sedan | | | | | Bypass |
| Date | Time | Shift | | | Clear |
| 09/19/2000 | 1:34:30 PM | 2nd Shift | | | |
| VIN Number | | Rotation Number | Plant | Clear Vision | Alignment Pit # |
| 1FAFP55U91A104678 | | 5933 | Atlanta | 1.3 | 1 |

Alignment Characteristics

| Front | Left | Right |
|---|---|---|
| Camber | -0.45 | -0.54 |
| Cross Camber | | 0.18 |
| Caster | 3.67 | 3.62 |
| Cross Caster | | 0.05 |
| SAI | | |
| Toe | -0.03 | -.012 |
| Total Toe | | -0.15 |

| Rear | Left | Right |
|---|---|---|
| Camber | -1.12 | -0.54 |
| Toe | 0.11 | 0.00 |
| Total Toe | | 0.18 |
| Thrust Angle | | 0.04 |

Notes/Comments

*Fig. 2*

Atlanta Assembly Plant　　　　　　　　　　　　　　　　　　　　　　　　Model Year - 2000

Report Date: 7/28/2000　　　Shift: 2nd Shift　　　[Retrieve]　[Print]　[Close]

| VEHICLE | VIN | ROT # | MACH. | CASTER LEFT | CASTER RIGHT | FRONT LEFT | FRONT RIGHT | FRONT TOE | CLEAR VISION | THRUST | REAR CAMBER LEFT | REAR CAMBER RIGHT | REAR TOE LEFT | REAR TOE RIGHT |
|---|---|---|---|---|---|---|---|---|---|---|---|---|---|---|
| Taurus/Sable Sedan | 647175 | 8536 | 1 | 3.844 | 3.677 | -0.431 | -0.448 | -0.294 | -0.9 | -0.05 | -0.911 | -1.045 | 0.073 | 0.174 |
| Taurus/Sable Sedan | 647175 | 8566 | 3 | 4.03 | 3.5 | -0.728 | -0.28 | -0.245 | -1.5 | -0.081 | -0.893 | 1.046 | 0.133 | 0.296 |
| Taurus/Sable Sedan | 647025 | 8615 | 2 | 3.784 | 3.512 | -0.669 | -0.547 | -0.194 | -1.2 | -0.02 | -0.937 | -1.078 | 0.178 | 0.218 |
| REPAIR | 647335 | 8615 | 2 | 3.784 | 3.512 | -0.724 | -0.547 | -0.165 | -1.2 | -0.027 | -0.941 | -1.076 | 0.182 | 0.236 |
| Taurus/Sable Wagon | 285589 | 8654 | 3 | 3.628 | 3.499 | -0.45 | -0.714 | -0.214 | 0.3 | -0.025 | -0.311 | -0.774 | 0.065 | 0.116 |
| Taurus/Sable Wagon | 646943 | 8698 | 2 | 3.584 | 3.355 | -0.608 | -0.611 | -0.149 | -2.5 | -0.033 | -0.353 | -0.769 | 0.048 | 0.114 |
| Taurus/Sable Wagon | 280463 | 8763 | 1 | 3.933 | 3.473 | -0.615 | -0.494 | -0.268 | 0 | -0.004 | -0.427 | -0.586 | 0.076 | 0.085 |
| Taurus/Sable Sedan | 281091 | 8804 | 2 | 3.659 | 3.579 | -0.595 | -0.507 | -0.231 | -1.8 | 0.065 | -1.098 | -0.731 | 0.211 | 0.079 |
| Taurus/Sable Sedan | 277275 | 8907 | 1 | 3.87 | 3.525 | -0.489 | -0.494 | -0.101 | -0.6 | -0.075 | -1.296 | -0.663 | 0.139 | 0.29 |

Fig. 3

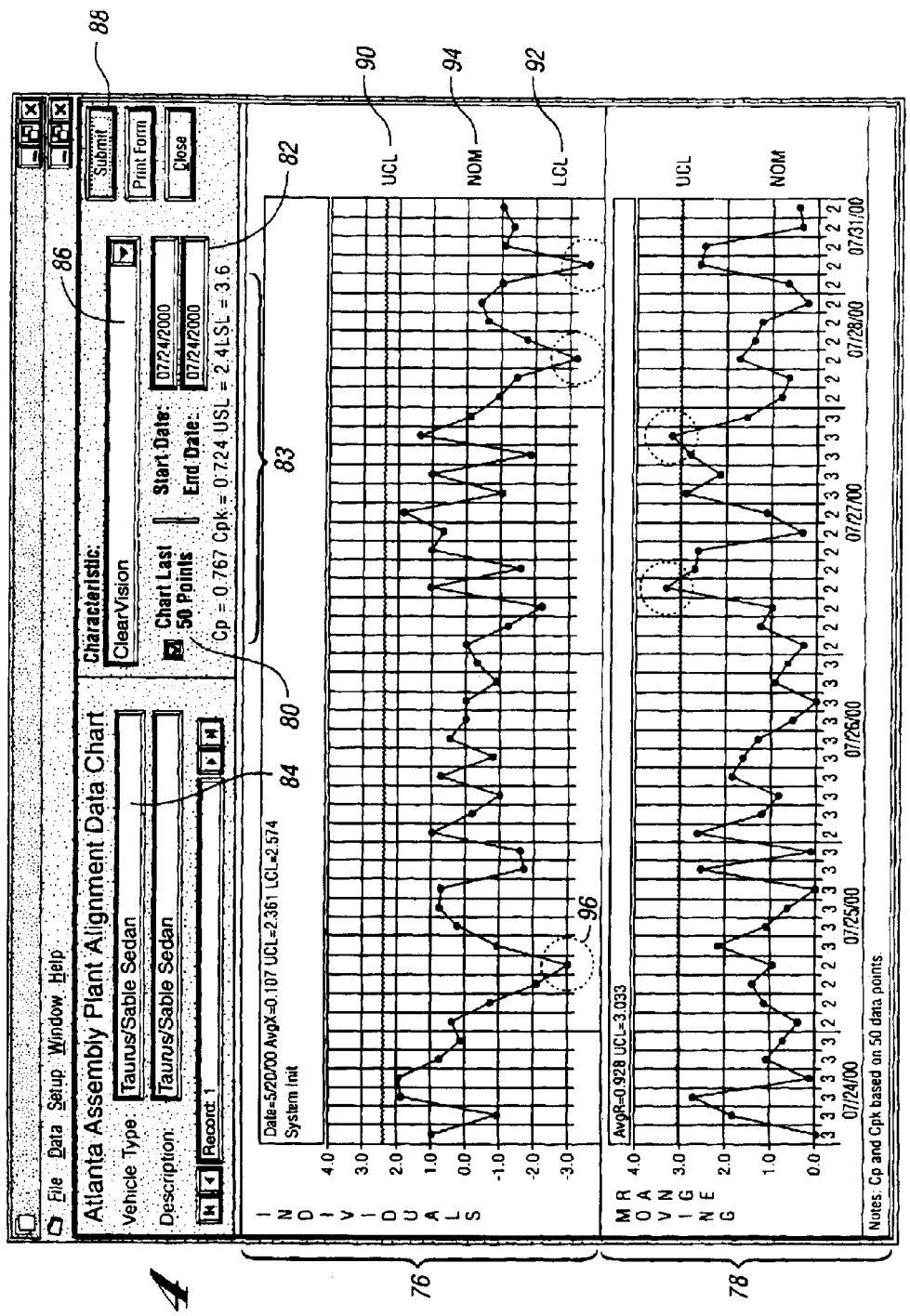

| Report Week of: 8/13/00 | | Vehicle Type: Taurus Sedan | | | | | | | | Model Year - 2000 | | | |
|---|---|---|---|---|---|---|---|---|---|---|---|---|---|
| | Front Alignment | | | | | | Rear Alignment | | | | | | |
| | Caster | | Camber | | Toe | CV | Caster | | Camber | | | | |
| | Left | Right | S/S | Left | Right | S/S | | Left | Right | S/S | Left | Right | S/S |
| High | 4.300 | 4.300 | 0.700 | 0.000 | 0.000 | 0.700 | 0.050 | 1.800 | -0.500 | -0.500 | 0.850 | 0.380 | 0.380 | 0.610 |
| Normal | 3.800 | 3.800 | 0.000 | -0.500 | -0.500 | 0.000 | -0.200 | -1.200 | -1.000 | -1.000 | 0.000 | 0.180 | 0.180 | 0.360 |
| Low | 3.300 | 3.300 | -0.700 | -1.000 | -1.000 | -0.700 | -0.450 | -4.200 | -1.500 | -1.500 | -0.850 | -0.020 | -0.020 | 0.110 |
| Mean | 3.859 | 3.586 | 0.273 | -0.514 | -0.459 | -0.055 | -0.254 | -0.957 | -1.234 | -0.798 | -0.436 | 0.174 | 0.148 | 0.321 |
| Std Dev | 0.110 | 0.083 | 0.130 | 0.134 | 0.098 | 0.158 | 0.058 | 0.876 | 0.099 | 0.078 | 0.132 | 0.064 | 0.043 | 0.075 |
| Cp | 1.520 | 2.020 | 1.800 | 1.244 | 1.703 | 1.473 | 1.447 | 1.141 | 1.690 | 2.139 | 2.138 | 1.035 | 1.545 | 1.117 |
| Cpk | 1.342 | 1.154 | 1.098 | 1.210 | 1.562 | 1.357 | 1.132 | 1.049 | 0.897 | 1.275 | 1.041 | 1.002 | 1.297 | 0.945 |
| Factor | 0.000 | 0.176 | 0.232 | 0.120 | 0.000 | 0.000 | 0.198 | 0.281 | 0.000 | 0.055 | 0.289 | 0.328 | 0.033 | 0.000 |

Alignment Health Factor  2.54

SYSTEM AND METHOD FOR GENERATING VEHICLE ALIGNMENT REPORTS

BACKGROUND OF THE INVENTION

This invention relates generally to computer software and computer systems and, more particularly, to an online system and method for generating vehicle alignment reports.

Conventionally, the automotive industry utilizes statistical process control (SPC) data charts for globally reporting vehicle alignment data to a central management location. To report the data, vehicle alignment auditing machine operators manually input vehicle alignment characteristics and alignment session information into an SPC terminal.

An improved methodology may provide for automatically reporting vehicle alignment data as it is output from alignment auditing machines at a plurality of distributed alignment centers. In addition, the methodology might relieve the alignment audit equipment operators of the menial task of reporting SPC alignment data thereby increasing the operator's overall daily efficiency.

The following patents disclose technology that, although related to the present invention, do not provide the effective solution to the prior art problems in the manner disclosed by the present invention.

U.S. Pat. No. 6,064,927 ("927) to Molbach et al. discloses a computerized system for facilitating the replacement of alignment components such as bushings or shims based on an assessment of a vehicle's alignment characteristics. Utilizing information provided by the patented system, a vehicle alignment technician can more accurately determine the proper alignment adjustment. This invention is an improvement over the prior art method of having to remove a vehicle wheel assembly more than once during the adjustment. What the Molbach system lacks, however, is an automated system in accord with the present invention for reporting and tracking vehicle alignment characteristics collected at a plurality of distributed vehicle alignment centers.

U.S. Pat. No. 5,948,024 ("024) to O'Mahony et al. discloses a computerized apparatus and method for diagnosing a vehicle's current alignment characteristics and outputting the difference between those characteristics and predefined alignment specifications for the vehicle. Based on the output, a vehicle alignment technician can more accurately adjust the vehicle's alignment to an acceptable state. Similar to the "927 patent to Molbach, as well as other prior art methods and systems, the "024 patent lacks an automated system in accord with the present invention for reporting and tracking vehicle alignment characteristics from a plurality of distributed vehicle alignment centers.

SUMMARY OF THE INVENTION

One aspect of the present invention comprises a system for generating vehicle alignment reports. The system comprises at least one computer having input/output capabilities, the at least one computer being configured to receive electronically a plurality of vehicle alignment characteristics directly from a vehicle alignment auditing machine, receive alignment session information, and upload the alignment characteristics and alignment session information via computer network to a central alignment data repository remote from the at least one computer. The computer is additionally configured to download historical vehicle alignment characteristics, historical alignment session information and predefined alignment specification information via computer network from the central alignment data repository and generate at least one historical alignment report based on the downloaded data.

Another aspect of the present invention comprises a method for generating vehicle alignment reports. The method comprises the steps of receiving at a computer a plurality of alignment characteristics in an electronic format directly from a vehicle alignment auditing machine, receiving at the computer alignment session information, and outputting the alignment characteristics and alignment session information via computer network to a central alignment data repository remote from the computer.

The method additionally comprises the steps of downloading historical vehicle alignment characteristics, historical alignment session information and predefined alignment specification information via computer network from the central alignment data repository and generating at least one historical alignment report based on the downloaded data.

BRIEF DESCRIPTION OF DRAWINGS

FIG. 2 is a graphical user interface (GVI) containing a form 50 for inputting and receiving alignment audit data in accord with the present invention;

FIG. 3 illustrates an example "Daily Shift Report" generated by the ADM application report generation utility in accord with the present invention;

FIG. 4 illustrates an example "Individual/Moving Range Characteristic" report generated by the ADM application report generation utility in accord with the present invention;

FIG. 5 illustrates an example "Alignment Health" report generated by the ADM application report generation utility in accord with the present invention;

FIG. 7 illustrates a GUI for uploading alignment specification data for a particular vehicle type to the central alignment data repository in accord with the present invention.

DETAILED DESCRIPTION

Figure 1:
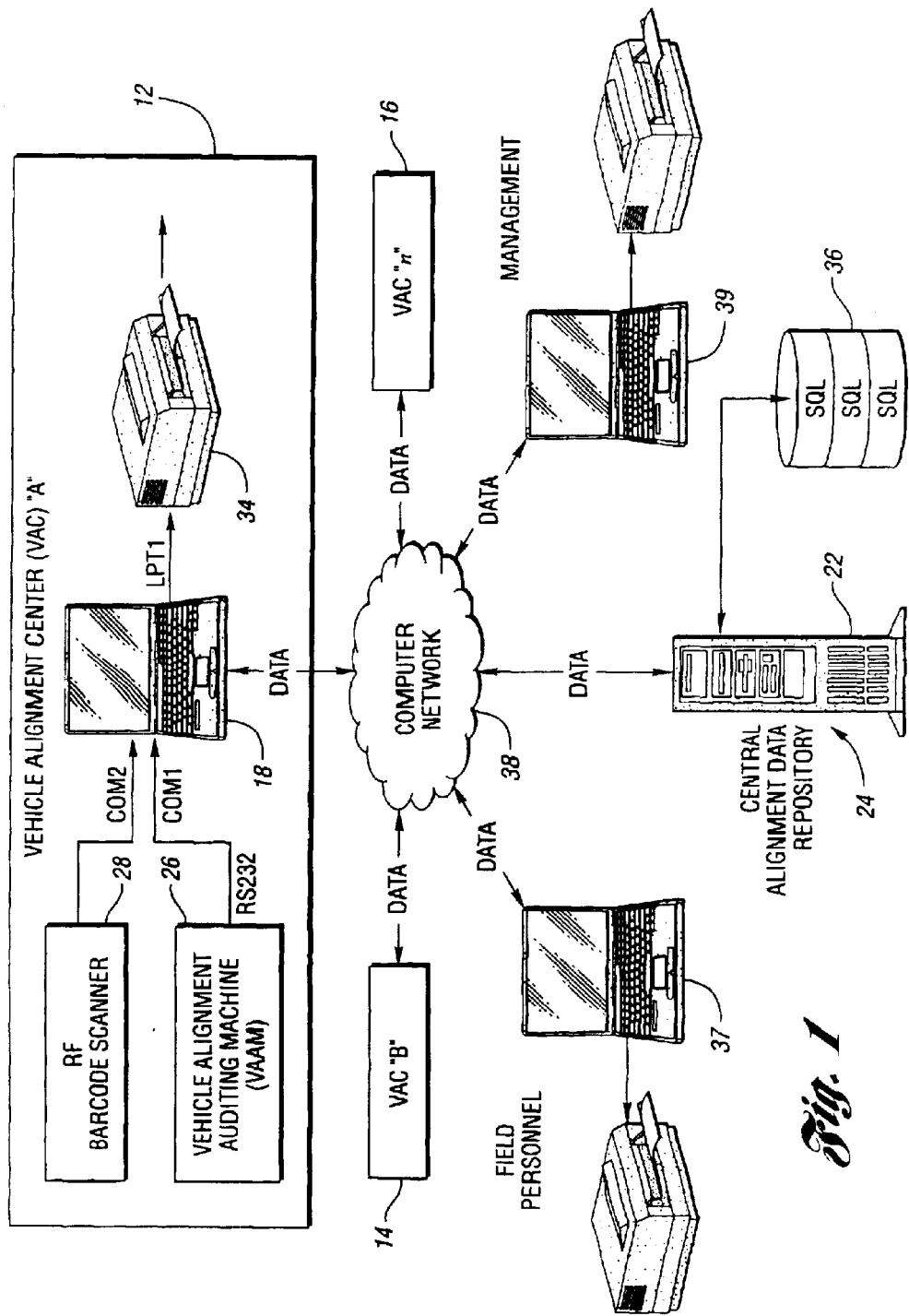
FIG. 1 illustrates a preferred system for implementing the present invention.

FIG. 1 illustrates a system in accord with a preferred embodiment of the present invention. The system comprises a plurality of distributed vehicle alignment centers (VAC) (e.g. VAC "A"12, VAC "B"14, VAC "n"16, etc.), and remote system users (e.g. field personnel 37, corporate management 39, etc.) operably linked via computer network 38 to a central data repository 24. As illustrated in VAC "A" (block 12), each distributed VAC generally comprises a personal computer (FACPC) 18 operably linked to a barcode scanner 28, a vehicle alignment auditing machine (VAAM) 26, and a printer 34.

The central data repository 24 comprises a server computer 22 operably configured to write data to and a read data from at least one database 36.

The computer network 38 interconnects the distributed components of the present invention (i.e., VACs, the central data repository, remote field personnel and management, etc.) for operable communication among the distributed components. The computer network includes but is not limited to one or any operable combination of the following: a local area network (LAN), a wide-area network (WAN), or the Internet including the World Wide Web.

In accord with a preferred embodiment of the present invention, vehicle alignment characteristics are generated and electronically output from the VAAM 26 to the VACPC 18 during or subsequent to a vehicle alignment audit session. Vehicle alignment characteristics electronically output by the VAAM 26 include, but are not limited to, left and right caster for front and rear wheels, front toe, clear vision, thrust, right and left rear camber, and right and left rear toe.

In further accord with the preferred embodiment, an alignment data management (ADM) software application is installed and running on the VACPC 18. The ADM application is operably configured to, inter alia, receive the vehicle alignment characteristic data output from the VAAM 26 during a vehicle alignment audit session and report the data via the computer network 38 to the central alignment data repository 24 for storage and, as discussed in more detail infra, subsequent retrieval for report generation purposes.

FIG. 2 is a graphical user interface illustrating a form 50 for inputting and receiving alignment audit data. During or subsequent to a vehicle alignment audit, alignment data electronically output from the VAAM is received by the ADM application and automatically input into alignment data field 66.

Additional information 65 collected and input into the form 50 during an audit session includes the type of vehicle being audited, the date, time, shift, and plant of audit, the vehicle identification number (VIN), rotation number, clear vision value, and alignment pin number.

Preferably, the vehicle type and VIN are automatically input to the data form 50 via the RF barcode scanner (illustrated in FIG. 1). As a new vehicle is mounted for audit by the VAAM, the VAAM operator utilizes the RF barcode scanner to scan the vehicle's identification barcode. The VIN and vehicle type data encoded within the barcode is output to the VACPC 18 and automatically input into the corresponding data input fields illustrated in FIG. 2.

Notably, a VAAM operator can select the "Bypass" button 70 to manually enter or bypass any data automatically input into the alignment audit session data form. The "Bypass" function is most helpful where a vehicle cannot be audited by the VAAM due to mechanical vehicle problems (e.g., incorrect springs, etc.). Additionally, the operator may input notes or comments corresponding to the current auditing session within the "Notes/Comments" data entry field 64.

Once all of the appropriate information for the current audit session has been input into the data form 50, the VAAM operator selects the "Submit" button 68. In response to this selection, the ADM application causes the collected audit session data to be output from the VACPC 18 and transmitted via the computer network 38 to the central alignment data repository 24 for storage within an SQL alignment information database 36.

Alignment information input into the SQL database 36 is stored within a plurality of data tables. Table 1 contains a listing of example data tables with corresponding descriptions and contents in accord with the present invention.

TABLE 1

| Data Table | Description | Contents |
| --- | --- | --- |
| Alignment Data | Alignment date for new vehicles | Time of AuditVehicle ModelVINAlignment CharacteristicsShift #Rotation #Alignment PIN #CommentsPlant Name |
| Repair Data | Alignment data for used vehicles | Time of RepairVehicle ModelVINAlignment CharacteristicsShift #Rotation #Alignment PIN #CommentsPlant Name |
| Vehicle Models | Vehicle model alternatives | Listing of all vehicle model alternatives |
| Vehicle Types | Vehicle type alternatives | Listing of all vehicle type alternatives |
| Control Limits | control limits with respect to the alignment characteristics (individual and moving range data) | Lower Control LimitCenter Line Control LimitUpper Control Limit |
| Alignment Specifications | Alignment specifications with respect to the alignment characteristics | Lower Alignment Spec.Nominal Alignment Spec.Upper Alignment Spec. |
| Assembly Plant | Plant where the alignment audit is being conducted | Assembly Plant |
| Adjustment Flags | Adjustable and non-adjustable parameters | Adjustable and non-adjustable parameters |

Another aspect of the ADM application comprises a report generation utility. The report generation utility is configured to generate reports based on historical, specification, and control limit information uploaded to the central data repository 24. In accord with a preferred embodiment of the present invention, the report utility is configured to generate reports including but not limited to daily alignment session shift reports, individual and moving range alignment characteristic reports, an alignment health report, and an alignment health factor trending report.

FIG. 3 illustrates an example "Daily Shift Report" generated by the ADM application report generation utility. The Daily Shift Report comprises a listing of the vehicles that were audited for a selected operator shift 75 along with the corresponding historical alignment characteristics uploaded to the central alignment data repository 24 during that shift. A color indicator 74 alerts viewers if a data point falls outside a predefined specification or control range. Specification and control range definition is discussed in more detail infra.

FIG. 4 illustrates an example "Individual/Moving Range Characteristic" report generated by the ADM application report generation utility. The Individual Characteristic report 76 is a chart plotting historical alignment characteristics 86 (i.e., clear vision) for a particular vehicle type 84 over a particular data range 80 or date range 82. The Moving Range Characteristics report 78 is a chart plotting a moving range of a particular alignment characteristic. The moving range is calculated based on the absolute value of a current characteristic minus the immediately preceding historical value for a particular vehicle type 84 (i.e., Taurus/Sable Sedan).

For each series plotted on the Individual/Moving Range Characteristic report, two data range options are provided. The first option 80 is to plot the last 50 data points. The second option 82 is to plot the data points collected over a particular date range. To generate a plot, the user chooses the vehicle type 84, the characteristic 86 and the plot option 80 or 82. Next, the user selects the "Submit" button 88 and the plots 76 and 78 are automatically generated based on the appropriate historical alignment data previously uploaded to the central alignment data repository 24. Notably, Cp, Cpk and LSL values 83 are calculated with respect to the plotted characteristic 86. The upper 90, lower 92, and center line 94 control and specification limits for the selected characteristic are also shown on the graph. An indicator 96 appears around a data point if the data point falls outside of the predefined specification or control limits.

FIG. 5 illustrates an example "Alignment Health" report generated by the ADM application report generation utility. This chart quantitatively summarizes how far the overall alignment for a selected vehicle type 100 falls outside of predefined specification or control limits for a given time period 102 (i.e., week of Aug. 13, 2000). To calculate an alignment characteristic factor 104, the actual Cpk 106 of a particular alignment characteristic is subtracted from a target Cpk (approximately 1.33). If the actual Cp exceeds the target Cpk, then the factor is zero. As illustrated in data field 110, the factors of each characteristic of alignment are summed to define an overall Alignment Health Factor. Preferably, the factors for each alignment characteristic are color coded to show their respective level of compliance with the corporate target Cpk. An example color coding scheme is as follows: Green: Cpk≧1.33, Yellow 1.33>Cpk>1.00, and Red: Cpk<1.00.

Figure 6:
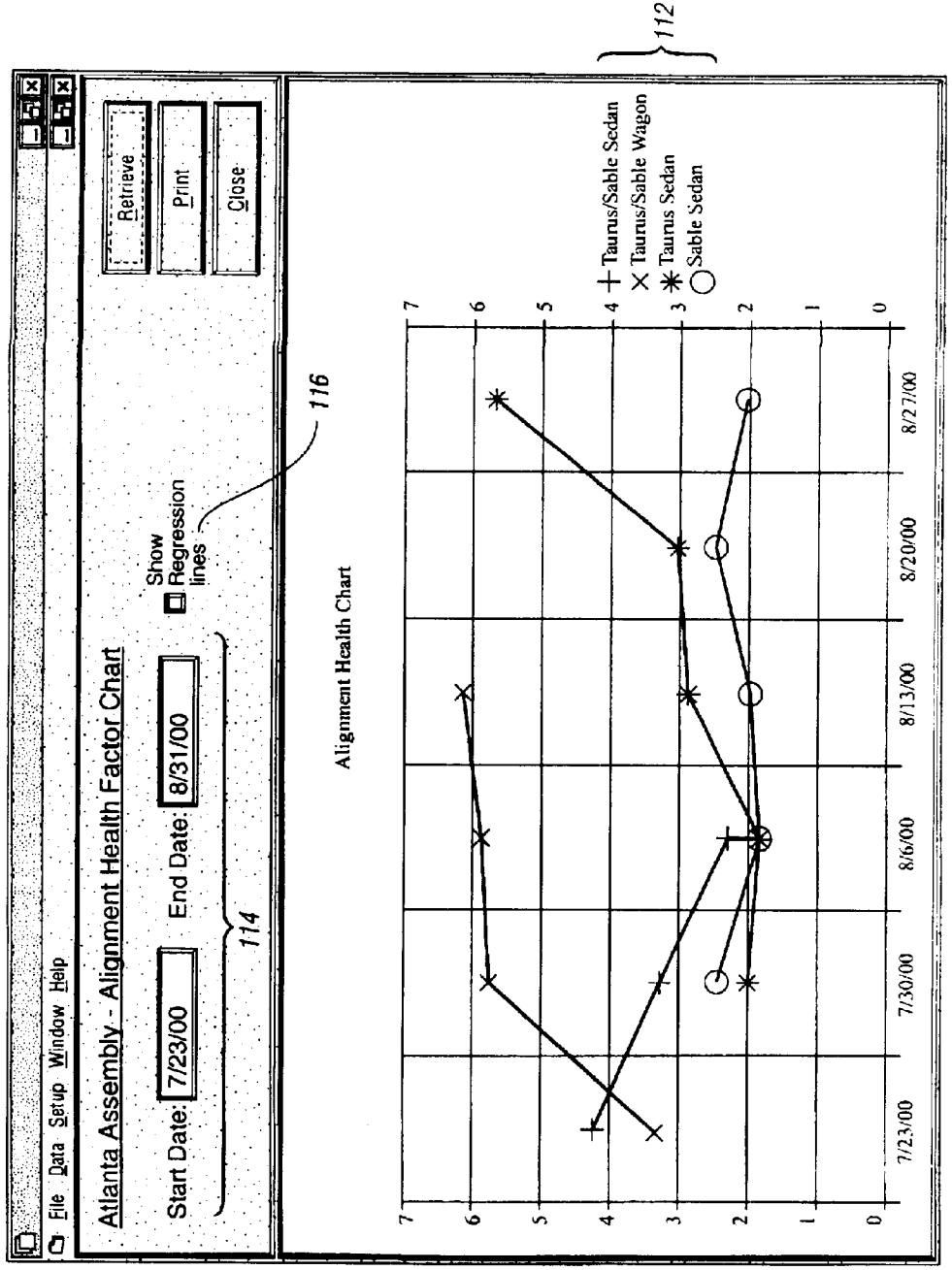
FIG. 6 illustrates an example "Health Factor Trending" chart generated by the ADM application report generation utility in accord with the present invention.

FIG. 6 illustrates an example "Health Factor Trending" chart generated by the ADM application report generation utility. The Health Factor Trending chart graphically illustrates the trend of alignment Health Factors (as described in FIG. 5) by vehicle type 112. The chart demonstrates how a particular vehicle's historical alignment health factors have changed over a particular date range 114. In addition, the chart plots regression lines (not shown) for each data series 112.

Figure 7:
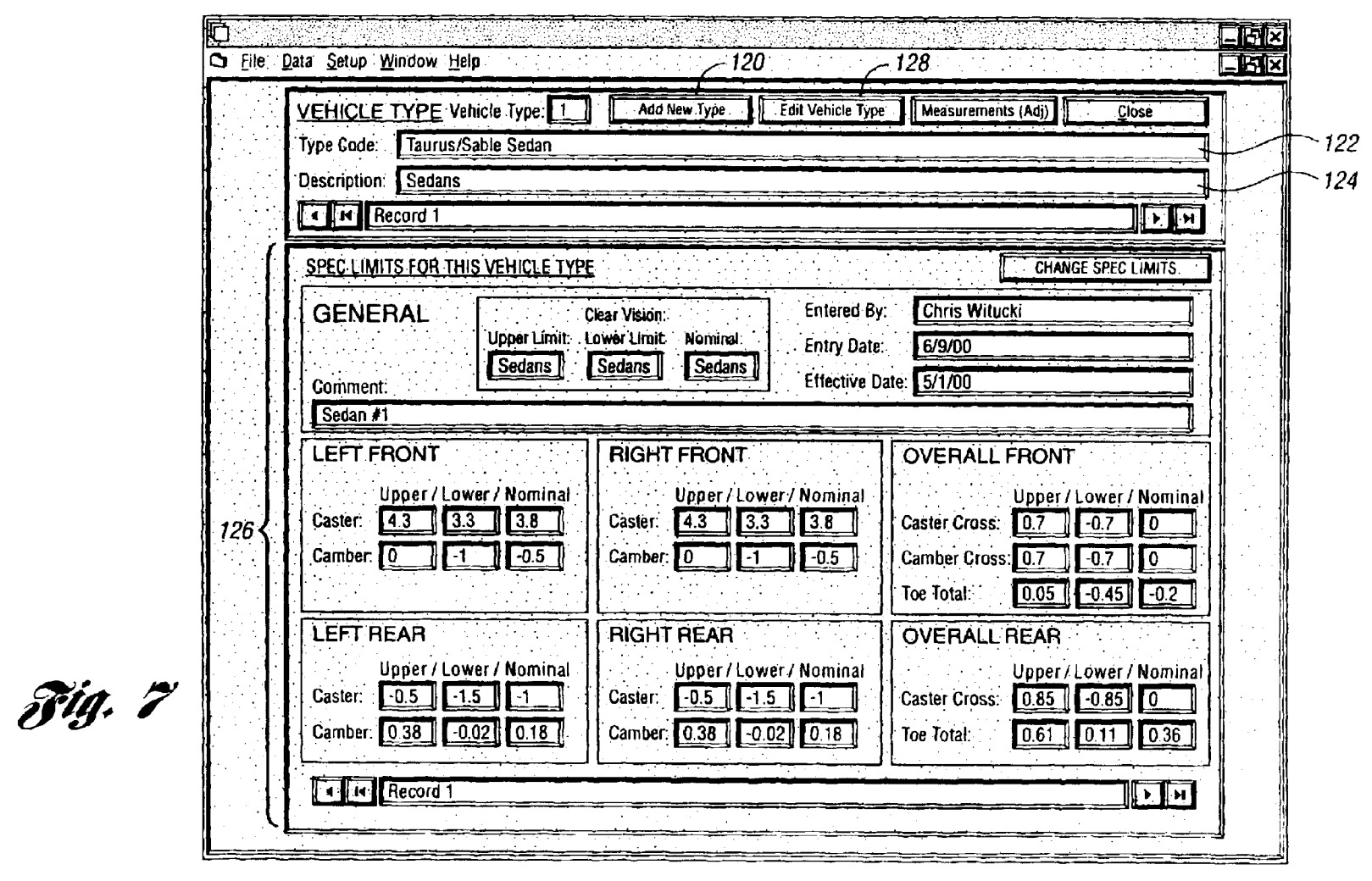

Yet another aspect of the ADM application comprises an alignment specification data management interface. FIG. 7 illustrates a GUI for uploading alignment specification data for a particular vehicle type to the central alignment data repository. Specification data includes but is not limited to an upper, lower, and nominal valve for left front caster and camber, right front caster and camber, overall front caster cross, camber cross and toe total, left rear camber and toe, right rear camber and toe, and overall rear camber cross and total toe.

To input alignment specification data for a new vehicle type, an authorized user selects the "Add New Type" button 120, enters a vehicle type code 122, a description 124, and enters the corresponding specification limits 126 for the vehicle. To edit alignment specification data for an existing vehicle type, an authorized user selects the "Edit Vehicle Type" button 128 and is presented with the corresponding specification data previously uploaded to the central vehicle alignment data repository.

Figure 8:
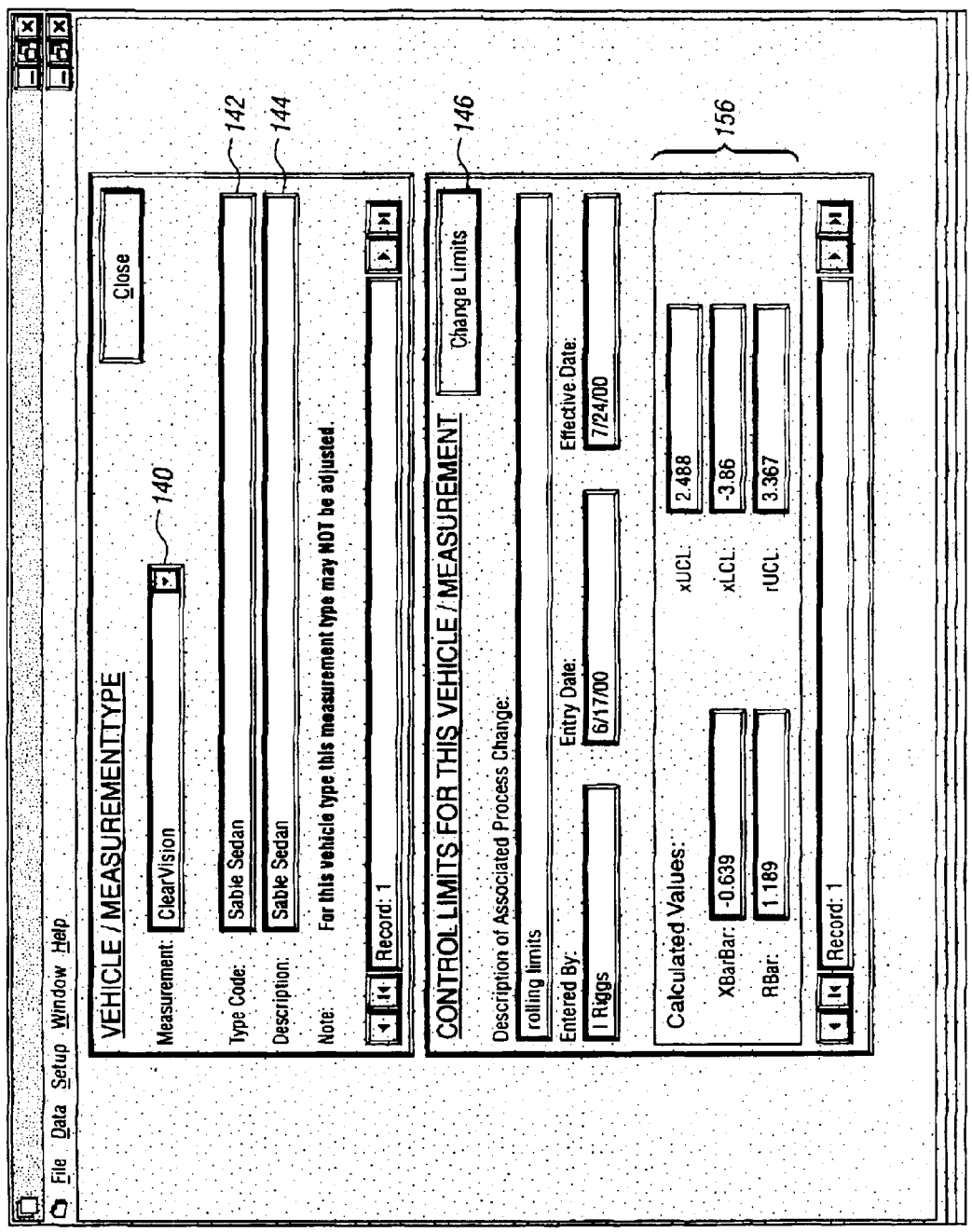
FIG. 8 illustrates a GUI for reviewing and updating alignment characteristic control limit values in accord with the present invention.

FIG. 8 illustrates a GUI for reviewing and updating alignment characteristic control limit values. Generally, updates to control limit values are made by a vehicle alignment center operator in response to a process change. For example, an alignment audit process change may be implemented that results in shifting a process mean toward a nominal alignment value.

To view an existing control limit, the operator selects the measurement 140 and inputs the vehicle type 142 and description 144. To update control limits for a specified vehicle, the operator selects the "Change Limits" button 146 and the application automatically inputs the updated control limits 156.

In accord with a preferred embodiment of the ADM application, process control limits 156 are defined according to the following equations:

$$\overline{X} = \text{Process Mean} = \frac{\sum (X_1 + X_2 + X_R)}{n};$$

$$\overline{R} = \text{Range Mean} = \frac{\sum (R_2 + R_3 + R_R)}{n-1} \text{ where } R = |X_n - X_{n-1}|;$$

$$\times UCL = \overline{X} + 2.66 * \overline{R};$$

$$\times LCL = \overline{X} - 2.66 * \overline{R}; \text{ and}$$

$$\sqrt{UCL} = 3.27 * \overline{R}.$$

Referring again to FIG. 1, other distributed users of the present invention include but are not limited to field personnel 37 and corporate management 39 running the ADM application on their respective personal computers networked to the central alignment data repository 24. Authorized remote users upload specification and/or control limit data to the central alignment data repository 24. Additionally, remote users utilize the ADM application report generation utility to generate any of the plurality of historical alignment data reports, as discussed in detail supra.

While the best mode for carrying out the invention has been described in detail, those familiar with the art to which this invention relates will recognize various alternative designs and embodiments for practicing the invention as defined by the following claims.

What is claim is:

1. A system for centrally reporting vehicle alignment health based on historical vehicle alignment data collected from among a plurality of distributed vehicle alignment centers, the system comprising a plurality of distributed vehicle alignment centers each having one or more computers configured to receive a plurality of historical vehicle alignment data and alignment session information, and transmit said vehicle alignment data and alignment session information from the distributed vehicle alignment centers to a central data repository via a computer network, said central data repository comprising at least one computer configured to calculate and report a vehicle alignment health trend based on the plurality of vehicle alignment data and alignment session information received from one or more of the distributed vehicle alignment centers.

2. The system of claim 1 wherein the vehicle alignment health trend displays vehicle alignment health over a specified period of time.

3. The system of claim 1 wherein the vehicle alignment health trend displays vehicle alignment health for a specified vehicle type.

4. The system of claim 1 wherein the vehicle alignment health trend displays vehicle alignment health for a specified vehicle alignment center.

5. The system of claim 1 wherein the vehicle alignment health trend displays vehicle alignment health for a specified vehicle assembly plant.

6. The system of claim 1 wherein the at least one central data repository computer is additionally configured to generate an alignment data chart based on the plurality of vehicle alignment data and alignment session information received from one or more of the distributed vehicle alignment centers.

7. A method for reporting vehicle alignment health, the method comprising:
- at each of a plurality of distributed vehicle alignment centers, receiving historical vehicle alignment data and alignment session information into a computer;
- transmitting the vehicle alignment data and alignment session information from the distributed vehicle alignment centers to a central data repository via a computer network; and
- calculating and reporting an alignment health trend based on the vehicle alignment data and alignment session information received from one or more of the distributed vehicle alignment centers.

8. The method of claim 7 wherein the vehicle alignment health trend displays vehicle alignment health over a specified period of time.

9. The method of claim 7 wherein the vehicle alignment health trend displays vehicle alignment health for a specified vehicle type.

10. The method of claim 7 wherein the vehicle alignment health trend displays vehicle alignment health for a specified vehicle alignment center.

11. The method of claim 7 wherein the vehicle alignment health trend displays vehicle alignment health for a specified vehicle assembly plant.

12. The method of claim 7 additionally comprising generating an alignment data chart based on the plurality of vehicle alignment data and alignment session information received from one or more of the distributed vehicle alignment centers.

* * * * *